United States Patent
Burrows et al.

[11] Patent Number: 6,062,509
[45] Date of Patent: May 16, 2000

[54] RETROFIT CENTERLINE LUGGAGE BIN ASSEMBLIES COMPATIBLE WITH EXISTING AIRCRAFT BIN SUPPORTS

[75] Inventors: Ralph M. Burrows, Bellingham; Jack E. Hart, Belleuve, both of Wash.

[73] Assignee: Hexcel Corporation, Pleasanton, Calif.

[21] Appl. No.: 09/009,756

[22] Filed: Jan. 20, 1998

Related U.S. Application Data

[63] Continuation-in-part of application No. 08/516,908, Aug. 18, 1995, Pat. No. 5,716,027, which is a continuation-in-part of application No. 08/363,765, Dec. 23, 1994, Pat. No. 5,549,258.

[51] Int. Cl.[7] ....................................................... B64C 1/22
[52] U.S. Cl. ........................................................... 244/118.5
[58] Field of Search ............................ 244/118.1, 118.5, 244/118.2; 248/343; 312/245, 246

[56] References Cited

U.S. PATENT DOCUMENTS

| | | |
|---|---|---|
| 3,025,122 | 3/1962 | Millman . |
| 3,102,607 | 9/1963 | Roberts . |
| 4,580,853 | 4/1986 | Hitzeroth et al. . |
| 4,753,406 | 6/1988 | Kodama et al. . |
| 4,799,631 | 1/1989 | Humphries et al. . |
| 4,907,762 | 3/1990 | Bock et al. . |
| 4,947,762 | 8/1990 | Perzl et al. . |
| 5,108,048 | 4/1992 | Chang . |
| 5,129,597 | 7/1992 | Manthey et al. . |
| 5,347,434 | 9/1994 | Drake . |
| 5,383,628 | 1/1995 | Harrichausen et al. . |
| 5,395,074 | 3/1995 | Hart et al. . |
| 5,549,258 | 8/1996 | Hart et al. . |
| 5,716,027 | 2/1998 | Hart et al. . |
| 5,839,694 | 11/1998 | Bargull et al. . |

FOREIGN PATENT DOCUMENTS

0614806A1  9/1994  European Pat. Off. .

OTHER PUBLICATIONS

O'Lone Richard G., *Aviation Week & Space Technology*, Apr. 28, 1969, pp. 32 and 33.

*Primary Examiner*—Peter M. Poon
*Assistant Examiner*—Tien Dinh
*Attorney, Agent, or Firm*—Christensen O'Connor Johnson & Kindness PLLC

[57] ABSTRACT

The invention provides centerline luggage bin assemblies, for retrofitting existing aircraft with replacement, preferably larger, overhead storage bins, that are compatible with the existing aircraft bin support structure for original equipment bins. The assemblies include both a bin structure and supporting brackets that engage the existing aircraft bin supports with little or no modification to the existing supports. This facilitates rapid retrofit of the aircraft, thereby reducing aircraft out-of-service time and also costs of manpower used to retrofit the aircraft.

5 Claims, 2 Drawing Sheets

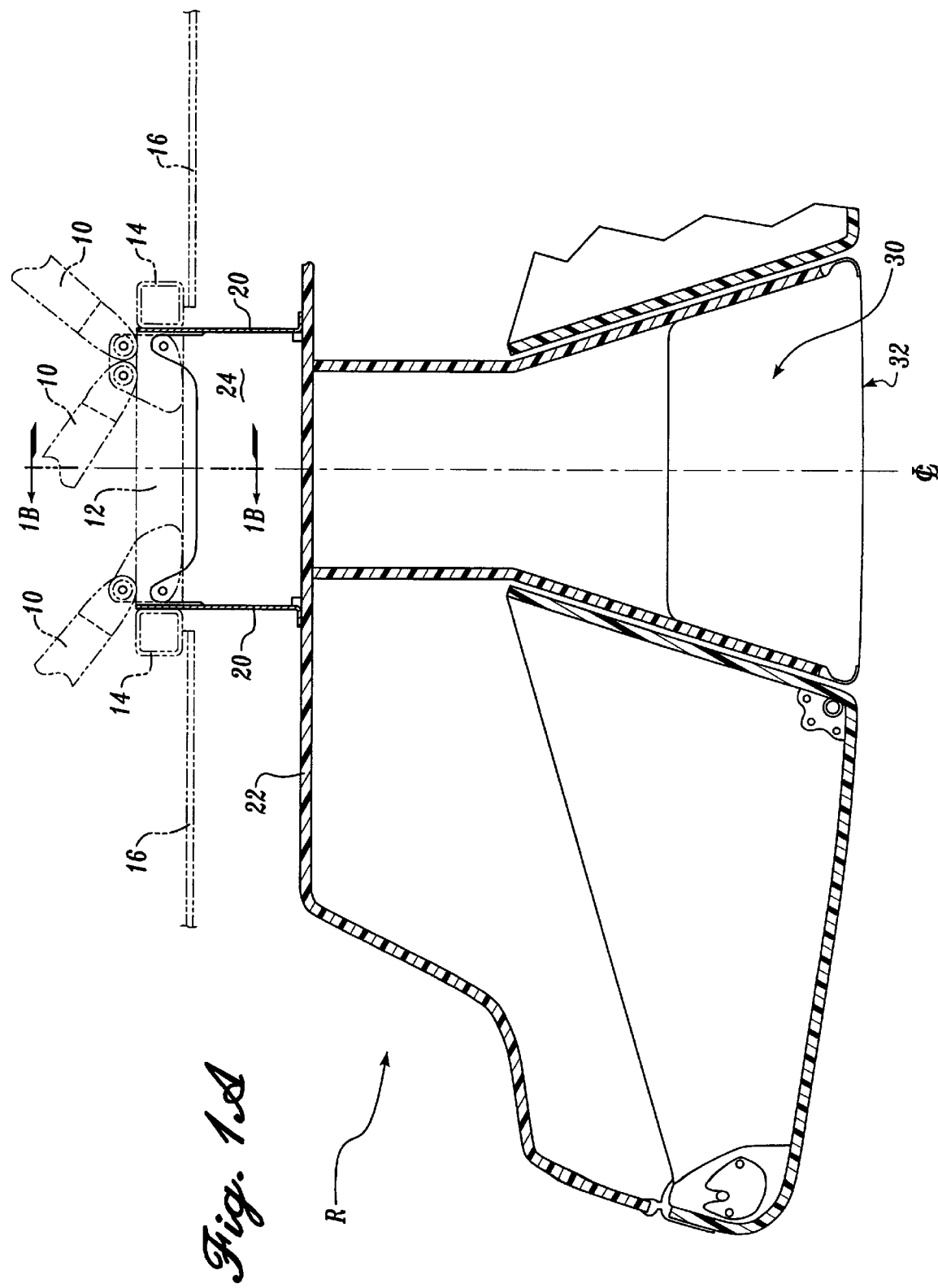

RETROFIT CENTERLINE LUGGAGE BIN ASSEMBLIES COMPATIBLE WITH EXISTING AIRCRAFT BIN SUPPORTS

STATEMENT OF RELATED APPLICATIONS

This application is a continuation-in-part of U.S. Ser. No. 08/516,908 filed Aug. 18, 1995, now U.S. Pat No. 5,716,027, which is in turn a continuation-in-part of U.S. Ser. No. 08/363,765 filed Dec. 23, 1994, now U.S. Pat. No. 5,549,258.

FIELD OF THE INVENTION

The invention relates to overhead luggage bins used in aircraft for storing the carry-on luggage of passengers. More specifically, the invention provides a luggage bin assembly compatible with the existing bin support structure of aircraft to permit ready retrofitting of the aircraft with bins of larger volume and more modem design.

BACKGROUND OF THE INVENTION

Passenger aircraft, as originally equipped, include overhead bins for the storage of passenger carry-on luggage. Usually, these bins are located overhead on either side of the aisle, above the passenger seating space. In larger, wide-bodied aircraft, such as the Boeing 747, luggage bins are also provided above the central passenger seating space, in order to provide additional luggage storage capacity. Typically, passenger service units, air conditioning ducting, and emergency equipment for breathing are located in close proximity to the overhead bins.

In recent years, passengers have increasingly tended to travel with larger amounts of carry-on luggage, thereby placing a premium on available overhead luggage bin storage space. Because a large proportion of the world's existing aircraft fleet was built before this growing demand for carry-on luggage space, airlines using these aircraft find themselves in a less competitive position as compared to airlines using more modem aircraft that are equipped with larger original-equipment overhead bins. While airlines using these older aircraft have an identified need to upgrade and expand their carry-on luggage capacity to meet passenger demands, existing methods and retrofit assemblies for expanding carry-on luggage capacity are expensive, requiring lengthy aircraft out-of-service time. A standard type of aircraft retrofit would therefore significantly impact the costs and revenues of airlines, which frequently are already faced with thin profit margins due to intense competition in the industry.

Airlines that have aircraft with limited overhead storage space require an overhead luggage bin retrofit assembly that is rapid to install, thereby reducing aircraft out-of-service time and manpower costs; requires minimal, if any, modification to the existing aircraft bin support structure to support larger replacement luggage bins; and that meets all applicable regulatory safety requirements. Our prior patent application U.S. Ser. No. 08/516,908 filed Aug. 18, 1995, hereby fully incorporated by reference, disclosed and claimed overhead centerline bin retrofit assemblies that are compatible with the existing centerline bin support structure in an aircraft cabin. The existing support structure referred to in that disclosure usually includes a longitudinally extending rectangular box beam assembly or "spline" that is centrally mounted to the aircraft frame and extends downward into the cabin. The replacement bins were affixed to the spline, which remained in place.

SUMMARY OF THE INVENTION

The invention provides an aircraft overhead luggage bin retrofit assembly that is compatible with existing bin support structures in an aircraft cabin. Further, the aircraft retrofit assembly of the invention provides ease of installation so that the downtime for retrofitting an aircraft with larger replacement overhead bins on the sides and in the center of the cabin is significantly reduced.

Advantageously, the replacement overhead bins are usually larger than the original equipment bins and have large bins (or buckets in the case of hood and bucket bins) for ease of stowing and removal of luggage. Moreover, the bins may be designed to reduce the risk of luggage spilling from the bins when they are opened after flight, because of luggage movement during flight.

The aircraft luggage bin retrofit assemblies of the invention include mounting assemblies for the luggage bins that are designed to be compatible with the existing support structure for the original equipment bins in the aircraft. Usually, retrofitting with larger bins requires removal of these supports and replacing them with new supports. This is the biggest of the individual tasks required in current retrofits. Consequently, the invention, which retains some of these existing supports, but removes certain bulkier supports. The removed support includes a box beam assembly that extends along the length of the aircraft which results in a weight reduction.

The overhead centerline retrofit luggage bin assemblies of the invention are designed to be compatible with existing bin support structure in an aircraft cabin, that includes at least a series of spaced sets of tie rods that extend downward from the frame of the aircraft, along the length of the aircraft. The existing support structure also includes a pair of longitudinally extending parallel rails, each supported by the spaced set of tie rods; and transverse extending cross ties at spaced intervals between the parallel rails, to form a ladder-like structure. In accordance with the invention, a replacement centerline luggage bin includes a mounting assembly made up of at least a pair of laterally extending plates, each having a lower-portion attached to a top surface of the replacement centerline bin, and an upper portion adapted for fixed mechanical attachment to one of the cross ties. The mounting assembly further includes at least a pair longitudinally extending shear plates, each having a lower portion attached to the top surface of the replacement centerline bin, and an upper portion adapted for attachment to one of the rails that form a part of the existing bin support structure.

As part of the centerline bin retrofit of the invention, the center spline is removed, thereby saving weight and space allowing larger replacement bins. The passenger service units and air conditioning ducts generally do not have to be relocated. According to the invention, the facing panel of the passenger service unit may be replaced, if the replacement bins have a different sized base relative to the original bins, to preserve the aesthetics of the cabin appearance.

The centerline aircraft overhead luggage bin retrofit assemblies of the invention provide the increased overhead luggage bin capacity needed to meet the carry-on luggage requirements of modern-day air travel passengers while at the same time significantly reducing the cost of retrofitting existing aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, all of which are schematic and not to scale, wherein:

FIG. 1A is a schematic end view showing the existing aircraft centerline luggage bin support structure, the replacement bin mounting assembly, and the replacement luggage bin in place.

DETAILED DESCRIPTION OF THE PREFERRED EMBODIMENTS

Figure 1B:
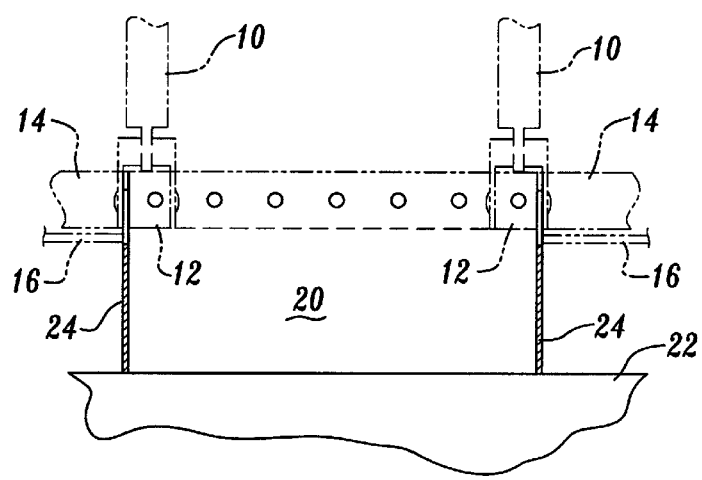
FIG. 1B is a schematic cross sectional view of the replacement bin mounting assembly and the existing support structure of FIG. 1A, taken at 1B—1B.

The invention provides several preferred embodiments of an aircraft overhead luggage bin retrofit assembly that is compatible with existing spineless aircraft centerline bin support structure such as is used in certain Boeing 747 aircraft cabins, and also in other aircraft. In particular, Boeing 747 series 200 and 300 aircraft have box beam assemblies to support their centerline bins. In accordance with the invention, these are removed. The accompanying schematic drawings illustrate certain specific embodiments of the invention, but the invention is not limited to these embodiments. However, for ease of explanation, reference may be had to the FIGS. in order to better understand certain features of the invention.

In the specification and claims, the term "mechanical attachment" encompasses those methods used and approved in the aircraft industry, including, but not limited to, attachment by nuts and bolts, rivets, screws, threaded bolts into threaded inserts, and adhesive bonding. The term "longitudinal" means along the length of the aircraft cabin i.e. forward-aft; and the term "lateral" means across the width of the aircraft cabin, i.e. inboard-outboard.

In order to install the retrofit luggage bin assemblies of the invention in an aircraft having original centerline bin support structure substantially as described above, the original equipment bin is first dismantled from the aircraft luggage bin support structure and removed. Next, the box beam assembly, if any, is removed. Thereafter, in accordance with the invention, the retrofit centerline luggage bin, with mounting assembly that is compatible with the remaining existing aircraft bin support structure, is installed.

The invention may be better understood with reference to the appended schematic figures, which are not to scale and only for illustrative purposes. In the embodiment of FIG. 1A, a pair of replacement centerline bins R have a mounting assembly ultimately supported by tie rods 10 that form part of the existing bin support structure of the aircraft. Tie rods 10 support a series of spaced existing cross ties 12 that extend between two existing parallel rails 14 that extend longitudinally along the cabin of the aircraft to form a ladder-like structure. This entire structure is usually concealed from passenger view by existing ceiling panels 16. The bin mounting assembly of the invention includes, a pair of spaced-apart, longitudinally-extending, vertical, rectangular shear plates 20. Each of the plates 20 has an upper portion attached to one of the rails 14, and a lower portion, preferably curved to form a horizontal footing, attached to the top outer surface 22 of the luggage bin R. These plates 20 not only support the bin R, but also restrain forward/aft movement of the bin. As shown, the luggage bin R preferably has a single top surface 22 common to a pair of opposite facing luggage bins to enhance rigidity. In order to secure the replacement bins from side to side (or inboard/outboard) motion, the invention provides vertical shear plates 24 extending laterally at spaced intervals preferably corresponding to the location of cross ties 12. Thus, as shown in FIGS. 1A and 1B, the upper portion of the shear plate 24 is attached to the cross tie 12, while the lower portion is preferably curved to form a horizontal footing that is attached to the top 22 of the replacement luggage bins.

The lower central space between the pair of bins R is utilized to contain air conditioning and other conduits and the passenger service unit 30. The original passenger service unit may be retained, or replaced if the replacement bin dimensions so dictate. Also, the passenger service unit face plate 32 may be updated, if desired.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An aircraft overhead centerline bin retrofit assembly compatible with existing bin support structure in an aircraft cabin, said existing bin support structure including at least a series of spaced sets of existing bin support tie rods extending downward from a frame of the aircraft, a pair of longitudinally extending horizontal parallel rails, each supported by the spaced sets of tie rods, and a series of spaced cross ties extending between the parallel rails, the bin retrofit assembly comprising:

(a) a replacement centerline luggage bin; and
    (b) a mounting assembly for fixed mechanical attachment and support of the replacement luggage bin to the existing bin support structure, the mounting assembly comprising:
        (i) a pair of laterally extending shear plates, each having a lower portion thereof attached to the replacement centerline bin in the vicinity of the top of said bin, and an upper portion of the plate adapted for mechanical attachment to one of the existing bin support cross ties; and
        (ii) a pair of longitudinally extending shear plates each having an upper portion mechanically adapted for attachment to one of the parallel rails, and a lower portion attached to the replacement luggage bin.

2. In an aircraft overhead centerline bin retrofit assembly, wherein a box beam structure has been removed from an existing aircraft bin support structure, and remaining aircraft bin support structure includes at least: a series of longitudinally spaced sets of existing bin support tie rods extending downward from a frame of the aircraft, a pair of horizontal longitudinal parallel rails, each supported by at least one of the spaced sets of tie rods, and a series of spaced horizontal cross ties extending between the parallel rails; the improvement comprising a retrofit luggage bin assembly comprising:

(a) a replacement centerline luggage bin; and
    (b) a mounting assembly for fixedly attaching the replacement centerline luggage bin to the existing bin support structure, the mounting assembly comprising:
        (i) a pair of laterally extending shear plates, each having a lower portion thereof attached to the replacement centerline bin in the vicinity of the top of said bin, and an upper portion of the plate adapted for fixed mechanical attachment to one of the cross ties; and
        (ii) a pair of longitudinally extending shear plates each having, an upper portion mechanically adapted for attachment to one of the pair of parallel rails, and a lower edge attached to the replacement luggage bin, the pair of longitudinal shear plates restraining forward/aft movement and the pair of lateral shear plates restraining inboard/outboard movement to securely support the replacement luggage bin.

3. An aircraft overhead centerline bin retrofit assembly compatible with existing bin support structure in an aircraft cabin, said existing bin support structure including at least a series of spaced sets of existing tie rods extending downward from a frame of the aircraft, a pair of longitudinally extending horizontal parallel rails, each supported by the spaced sets of tie rods, and a series of spaced cross ties extending between the parallel rails, the retrofit bin assembly comprising:

(a) a replacement centerline luggage bin; and
(b) a mounting assembly for fixed mechanical attachment of the replacement luggage bin to the existing bin support structure, the mounting assembly comprising:

(i) means for supporting the replacement bin and for restricting forward and aft movement of the bin, the means adapted for attachment to the centerline bin in the vicinity of the top of said bin, and adapted for fixed mechanical attachment to one of the existing rails; and
(ii) means for supporting the bin and for restraining inboard/outboard movement of the bin, said means adapted for mechanical attachment to one of the spaced cross ties, and attachment to the replacement luggage bin.

4. The bin assembly of claim 3, wherein the means for supporting and restricting forward and aft movement comprises a shear plate.

5. The bin assembly of claim 3, wherein the means for supporting and restraining inboard/outboard movement comprises a lateral shear plate.

* * * * *